US012668551B2

(12) United States Patent
　Maslennikov et al.

(10) Patent No.: US 12,668,551 B2
(45) Date of Patent: Jun. 30, 2026

(54) PROTECTIVE COATING AND APPLICATION METHOD

(71) Applicants:Oleg Maslennikov, Maple (CA); Anton Lushnikov, Maple (CA)

(72) Inventors: Oleg Maslennikov, Maple (CA); Anton Lushnikov, Maple (CA); Sergei Lushnikov, Viiajoyosa (ES)

(73) Assignees: Oleg Maslennikov, Maple (CA); Anton Lushnikov, Maple (CA)

( * ) Notice: Subject to any disclaimer, the term of this patent is extended or adjusted under 35 U.S.C. 154(b) by 91 days.

(21) Appl. No.: 18/933,197

(22) Filed: Oct. 31, 2024

(65) Prior Publication Data

US 2025/0236566 A1　Jul. 24, 2025

Related U.S. Application Data

(63) Continuation-in-part of application No. 18/416,850, filed on Jan. 18, 2024, now abandoned.

(51) Int. Cl.
| | |
|---|---|
| *C04B 41/00* | (2006.01) |
| *C04B 41/45* | (2006.01) |
| *C04B 41/48* | (2006.01) |
| *C04B 41/50* | (2006.01) |

(52) U.S. Cl.
CPC ...... *C04B 41/4826* (2013.01); *C04B 41/4505* (2013.01); *C04B 41/4574* (2013.01); *C04B 41/5035* (2013.01)

(58) Field of Classification Search
None
See application file for complete search history.

(56) References Cited

U.S. PATENT DOCUMENTS

2005/0214527 A1* 9/2005 Dudick ................... C04B 41/70
427/180

FOREIGN PATENT DOCUMENTS

| AU | 5953300 A | * | 2/2001 | |
|---|---|---|---|---|
| JP | H10102792 A | * | 4/1998 | |
| RU | 2720542 C1 | * | 5/2020 | ............. E02D 29/12 |

* cited by examiner

*Primary Examiner* — David P Turocy
(74) *Attorney, Agent, or Firm* — Orin Del Vecchio

(57) ABSTRACT

A method of applying a surface coating to a concrete surface with a joint wherein the method comprises the steps of: applying a primer layer to the concrete surface including the joint; applying a first laminate layer to the concrete surface excluding the joint and a region of the concrete surface surrounding the joint; applying a second laminate layer over the first laminate layer; applying a first flexible laminate layer over the region of the concrete surface surrounding the joint; applying a geotextile fabric layer over the joint and the region of the concrete surface surrounding the joint; and applying a second flexible laminate layer over the geotextile layer and a portion of the second laminate layer.

14 Claims, 5 Drawing Sheets

400

305

310

340

320

330

12

12

10

5

PROTECTIVE COATING AND APPLICATION METHOD

FIELD OF THE INVENTION

The present invention relates generally to structure coatings, more specifically but not by way of limitation, a multilayer application of polymer composite materials that are applied to reinforced concrete structures such as but not limited to concrete storage tanks wherein the coating and application method of the present invention provides an increase in the strength, tightness and durability of the concrete structure.

BACKGROUND

Precast concrete storage tanks are commercially available in a plurality of different sizes ranging from as small as five hundred gallons to over one million gallons in storage capacity. Conventional concrete tanks are reinforced with cast iron mesh that is employed as an internal support structure. Concrete tanks are employed for numerous applications that include but are not limited to waste water management and septic systems. While concrete tanks have proven effective there are many problems with the existing designs of concrete tanks.

One issue with existing concrete tanks is corrosion. A physico-chemical corrosion often occurs with concrete tanks which is the leaching of lime from the concrete that results in streaks, build-ups leading to the formation of cracks and the destruction of the concrete. A physico-mechanical corrosion can occur during sudden temperature fluctuations of the concrete surface causing damage to the concrete. Another type of corrosion that is common is organogenic corrosion, which occurs under the influence of organic substances present inside and outside the concrete tank. These organic substances can include but are not limited to soil colloids, gases, plant matter and animal microorganisms. Plant and animal organisms also lead to a biodefeat of the concrete tank. Other degradation of concrete tanks can occur due to non-compliance with technical requirements, utilization of contaminated aggregates, insufficient compaction of the concrete material during manufacturing of the tank and non-compliance with the temperature requirements during the tank manufacturing process.

Accordingly, there is a need for a coating and application method for a concrete tank wherein the coating will provide an increase in strength, water resistance and durability of the concrete tank.

SUMMARY OF THE INVENTION

It is the object of the present invention to provide a coating and an application method to apply the coating to a concrete surface or tank wherein the coating of the present invention is applied in a multi-layer process while providing for movement of joints within the concrete.

Another object of the present invention is to provide a method of applying a coating to a reinforced concrete structure wherein the method of the present invention includes application of resin and reinforcing materials using continuous lamination.

A further object of the present invention is to provide a coating and an application method to apply the coating to a concrete tank wherein the method of the present invention includes heating the concrete tank surface to a temperature between fifteen and twenty-two degrees Celsius.

Yet a further object of the present invention is to provide a method of applying a coating to a reinforced concrete structure wherein the method of the present invention includes ensuring the raw materials utilized for the coating are placed at a temperature of fifteen to twenty-two degrees Celsius.

Still another object of the present invention is to provide a coating and an application method to apply the coating to a concrete tank wherein the method of the present invention includes the step of applying an initial laminate layer.

An additional object of the present invention is to provide a method of applying a coating to a reinforced concrete structure wherein the method of the present invention includes a step of applying a second coating layer of emulsion glass mat.

Yet a further object of the present invention is to provide a method of applying a surface coating to a concrete surface with a joint wherein the method comprises the steps of: cleaning the concrete surface; repairing cracks in the concrete surface, wherein any cracks in the concrete surface are repaired and degreased; adjusting a temperature of the concrete surface, wherein the temperature of the concrete surface is adjusted to a temperature ranging between 15 to 22 degrees Celsius; conditioning surface coating materials utilized in the method, wherein the surface coating materials utilized in the method are conditioned to a temperature that is equivalent to the temperature of the concrete surface; applying a primer layer to the concrete surface including the joint; applying a first laminate layer to the concrete surface excluding the joint and a region of the concrete surface surrounding the joint; applying a second laminate layer over the first laminate layer applying a first flexible laminate layer over the region of the concrete surface surrounding the joint; applying a geotextile fabric layer over the joint and the region of the concrete surface surrounding the joint; and applying a second flexible laminate layer over the geotextile layer and a portion of the second laminate layer.

Within the operation of the method, the region of the concrete surface is at least six inches from the joint. The method may further comprise a step of applying a layer of bond breaker tape over the joint prior to the step of applying the first laminate layer.

The method may further comprise a step of cutting a termination keyway channel along a boundary marking the region of the concrete surface surrounding the joint prior to the step of applying the first laminate layer wherein the geotextile fabric layer and the first laminate later terminate within the keyway channel. The method may yet further comprise a step of mechanically anchoring the first laminate layer and the geotextile fabric layer within the termination keyway channel. The second flexible laminate layer may then cover the termination keyway channel The method may further comprise a step of applying one or more additional laminate layers over the second laminate layer. The method may yet further comprise a step of applying one or more additional coating layers over the second laminate layer.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
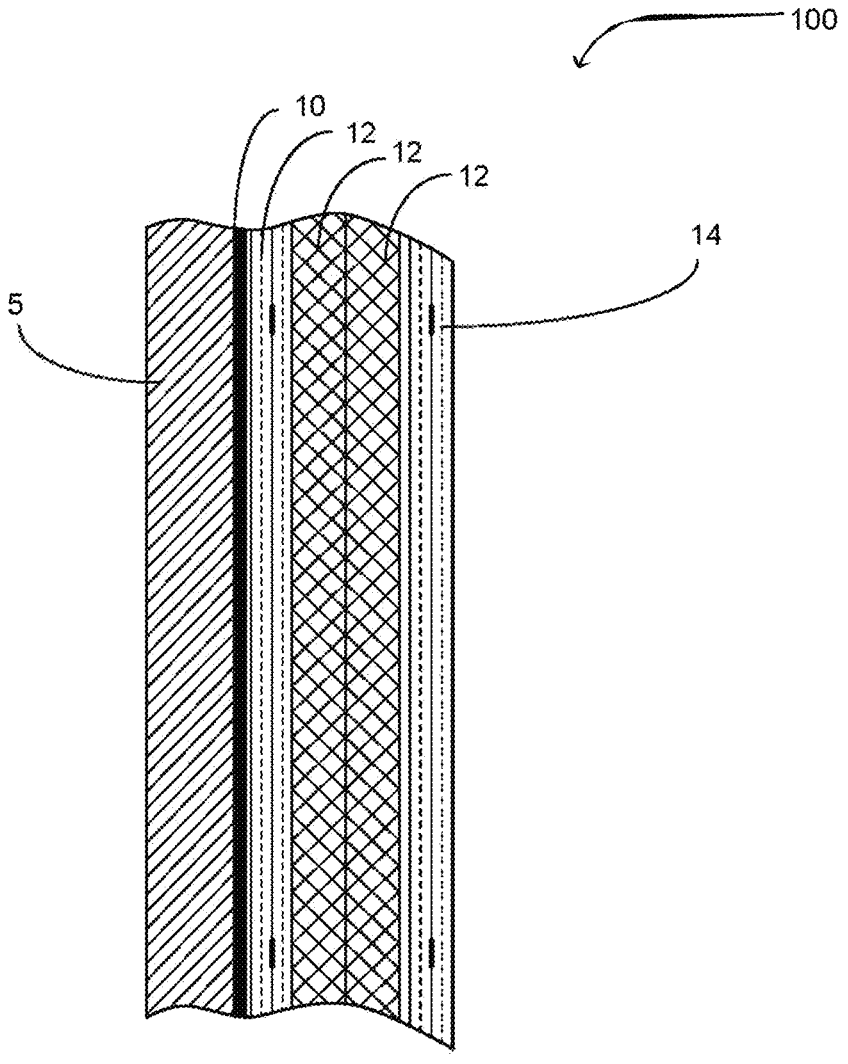
FIG. 1 is a diagrammatic view of the coating of the present invention.

Referring now to the drawings submitted herewith, wherein various elements depicted therein are not necessarily drawn to scale and wherein through the views and figures like elements are referenced with identical reference numerals, there is illustrated a surface coating 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the surface coating 100 includes a primer layer 10 that is applied as is discussed further herein to the concrete tank surface 5. Adjacent to the primer layer 5 are the laminate layers 12. While three laminate layers 12 are illustrated herein, it is contemplated within the scope of the present invention that the surface coating 100 could be comprised of more or less than three laminate layers. An outer layer 14 is adjacent the outermost laminate layer and in a preferred embodiment of the present invention the outer layer 14 is manufactured from gelcoat or similar material. In a preferred embodiment of the present invention the surface coating 100 has a total thickness of three and a half to four millimeters with an allowed deviation of 0.08 millimeters. While a concrete tank is utilized as an example herein to apply the surface coating 100 thereto, it should be understood within the scope of the present invention that the present invention could be applied to alternate concrete surfaces.

Figure 2:
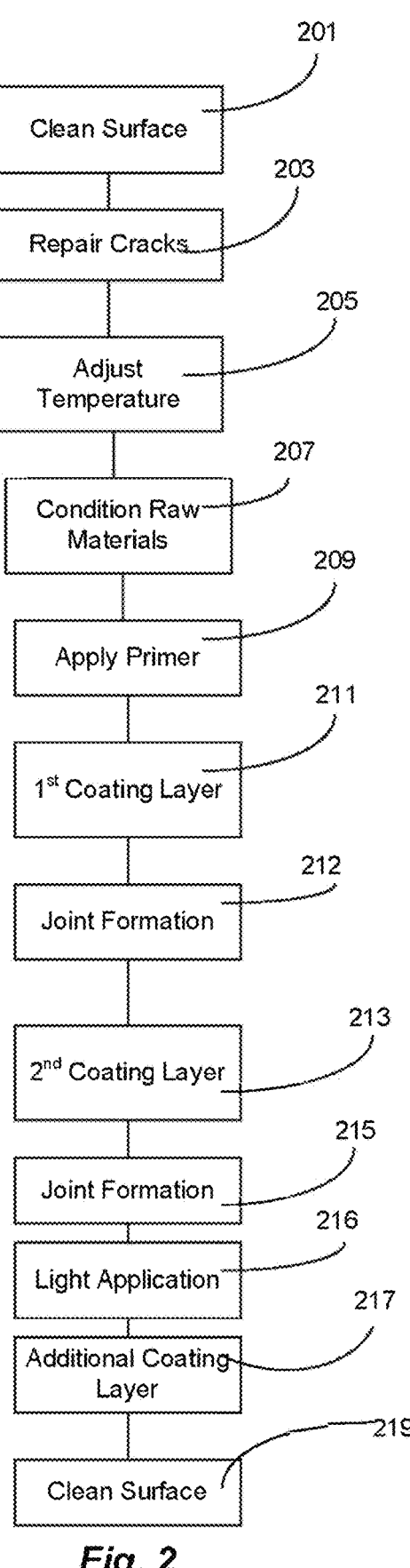
FIG. 2 is a flowchart of the process of the method of the present invention.

Referring in particular to FIG. 2, the method of the present invention is diagrammed therein. In step 201, the surface of the concrete tank to which the surface coating 100 will be applied is cleaned. It is contemplated within the scope of the present invention that the concrete surface to which the surface coating 100 is applied is cleaned employing an iron brush or sandblasting wherein the sandblasting with a mixture of water and sand under a pressure of 35-50 MPa. Step 203, subsequent cleaning of the surface of the concrete tank, the surface of the concrete tank must have any cracks therein repaired. After cleaning the surface of the concrete tank the cracks are repaired employing suitable material and degreased as needed. In step 205, the concrete tank surface has the temperature thereof adjusted to a temperature range of fifteen to twenty-two degrees Celsius. It is contemplated within the scope of the present invention that the temperature of surface of the concrete tank could be adjusted employing various equipment such as but not limited to an industrial heat blower. Step 207, the raw materials that will be employed to produce the laminate layers 12 of the present invention are conditioned at a temperature that is equivalent to the temperature of the concrete surface. In a preferred embodiment of the present invention, the raw materials are conditioned to a temperature between fifteen and twenty-two degrees Celsius. It should be understood within the scope of the present invention that the raw materials employed in the method of the present invention include but are not limited to, unsaturated polyester resins, hardener, catalyst, fiberglass mat having a 450-1250 $g/m^2$, polymer primer and gelcoat. In a preferred embodiment of the method of the present invention the concrete surface and raw materials are at the aforementioned temperature for approximately twenty-four hours.

In step 209, a primer is applied to the surface of the concrete tank. The primer utilizes unsaturated polyester resin and 3% hardener wherein the polymer primer includes quartz or epoxy resins. The primer is applied manually to the surface the concrete tank utilizing rollers or spraying in one layer to ensure adhesion between the surface of the concrete tank and the subsequent laminate coating layer in order to compensate for the contradiction of linear temperature expansions of the materials in contact with the primer. Primer consumption during application is at least 225 $g/m^2$ of the treated surface. The primer thickness in a preferred embodiment of the present invention is 0.12 millimeters with a deviation of 0.02 millimeters. Any corners and bends in the concrete tank surface are treated with a mixture of resin and talc. Step 211, the first laminate layer is applied adjacent to the primer layer. The first laminate layer is applied employing the following technique: the first laminate layer is a mixture of resin and hardener that is at 15 to 25 degrees Celsius, a layer of emulsion glass mat 450 $g/m^2$ having a width of 1250 millimeters or emulsion glass mat 600 $g/m^2$ having a width of 1250 millimeters or chopped fiberglass impregnated with a mixture of resin and hardener that is at a temperature of 15 to 25 Celsius. In step 212, the process of joint formation begins with the first layer wherein the joints adhere to the specifications discussed herein.

In step 213, the second laminate layer is applied adjacent to the first laminate layer. The second laminate layer consists of emulsion glass mat that is 450 g/m$^2$ having a width 1250 millimeters or emulsion glass mat 600 g/m$^2$ having a width of 1250 millimeters or chopped fiberglass consisting of a layer of a mixture of resin and hardener at a temperature of 15 to 25 degrees Celsius. In step 215, any joints are processed in accordance with the method of the present invention. It should be understood within the scope of the present invention that the joint process could be executed at any stage of applying any layer of the surface coating 100. At any joints, during formation of each laminate layer, it is desired within the scope of the present invention that an overlap of 50 millimeters±10 millimeters is achieved. The layers are applied wherein shifting thereof creates overlap points of approximately 200 millimeters. Each laminate layer is impregnated with resin and rolled with a disc roller to remove air bubbles. Resin consumption when applied to a glass mat is not less than 725 g/m$^2$, and resin consumption when applied to fiberglass is not less than 450 g/m$^2$. In step 216, a quality control step is executed wherein the quality control step includes the application of direct lights to the surface coating 100.

In step 217, the user of the method of the present invention applies additional laminate layers as discussed herein. Step 219, an outer layer is applied wherein the outer layer in a preferred embodiment of the present invention is a gelcoat. It is contemplated within the scope of the present invention that the outer layer could be comprised of alternate materials and achieve the desired result. It should be understood within the scope of the present invention that each laminate layer is processed with a sanding abrasive prior to application of the subsequent laminate layer.

The concrete tank or surface may include one or more moving joints, also known as cold joints or expansion joints, designed to accommodate structural movement due to factors like temperature changes, settling, or seismic activity. Moving joints are also commonly used in bridges, buildings, and pipelines. Moving joints enhance a structure's longevity and stability by allowing necessary structural movement adjustments based on these factors.

With the objective of the present invention being to make the concrete structure watertight, both the non-moving and moving (joint) surfaces must be considered. According, the non-moving surfaces are protected with a solid resin/mat as described above, and the moving surfaces (joints) in addition to being protected, must also be allowed to flex to enable both structural movement and maintain watertightness. Accordingly, the joints are protected with a flexible geotextile and resin.

Figure 3:
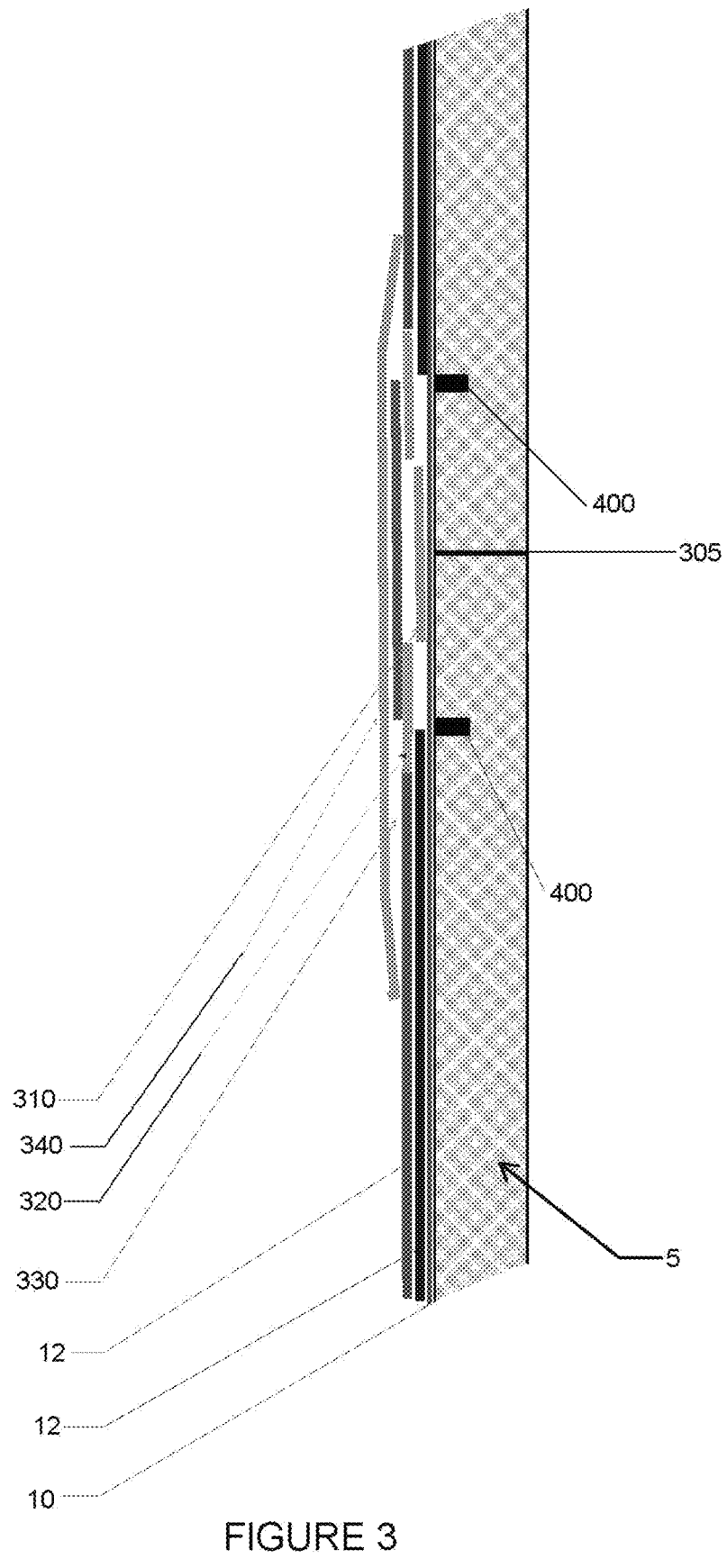
FIG. 3 is a cutaway view of a treated concrete surface with a joint.
Figure 4:
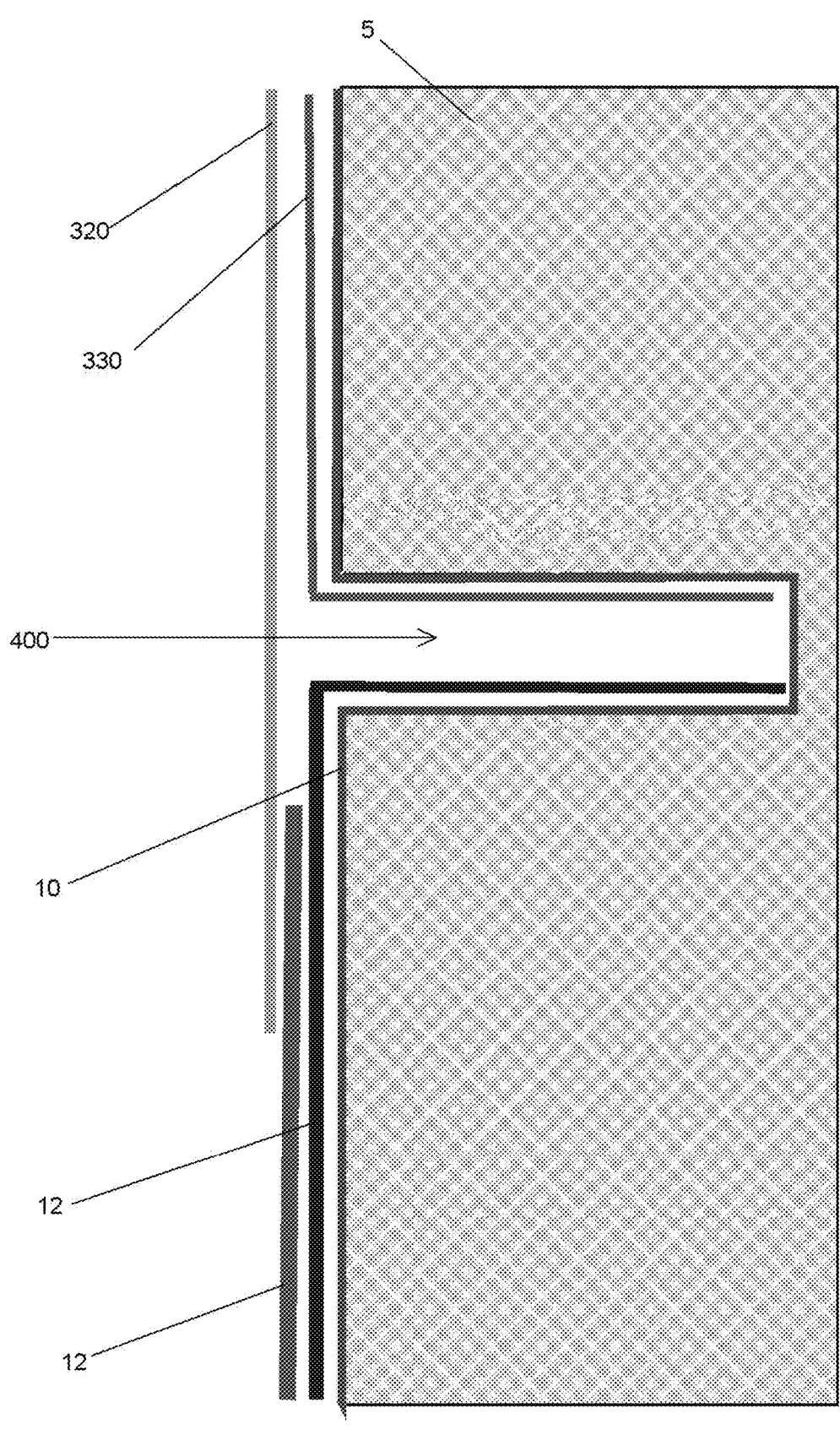
FIG. 4 is a closeup view of FIG. 3.

Referring to FIGS. 3 and 4, the method may be modified where there is a moving joint 305 as part of the concreate surface 5. The cleaning, repairing and temperature conditioning steps proceed as described above. The primer layer 10 is applied to the concrete surface 5 and the joint 305, however the first laminate layer 12 and the second laminate layer 12 are applied to the concrete surface 5 excluding the joint 305 and a region of the concrete surface surrounding the joint 305. Typically, the region is an area within six inches of the joint 305. In some applications, a layer of bond breaker tape 310 may be applied over the joint 305 to control application of the laminate layers 12 and ensure proper joint movement is maintained.

A first flexible laminate layer 320 is applied to the region of the concrete surface surrounding joint 305 and excluding the joint 305. A geotextile fabric layer 330 is then applied over the joint 305 and the first flexible laminate layer 320. A second flexible laminate layer 340 is then applied over the geotextile layer 330 and extending over a portion of the second laminate layer 12. Additional laminate layers or coating layers may then be applied over the second laminate layer 12.

Figure 5:
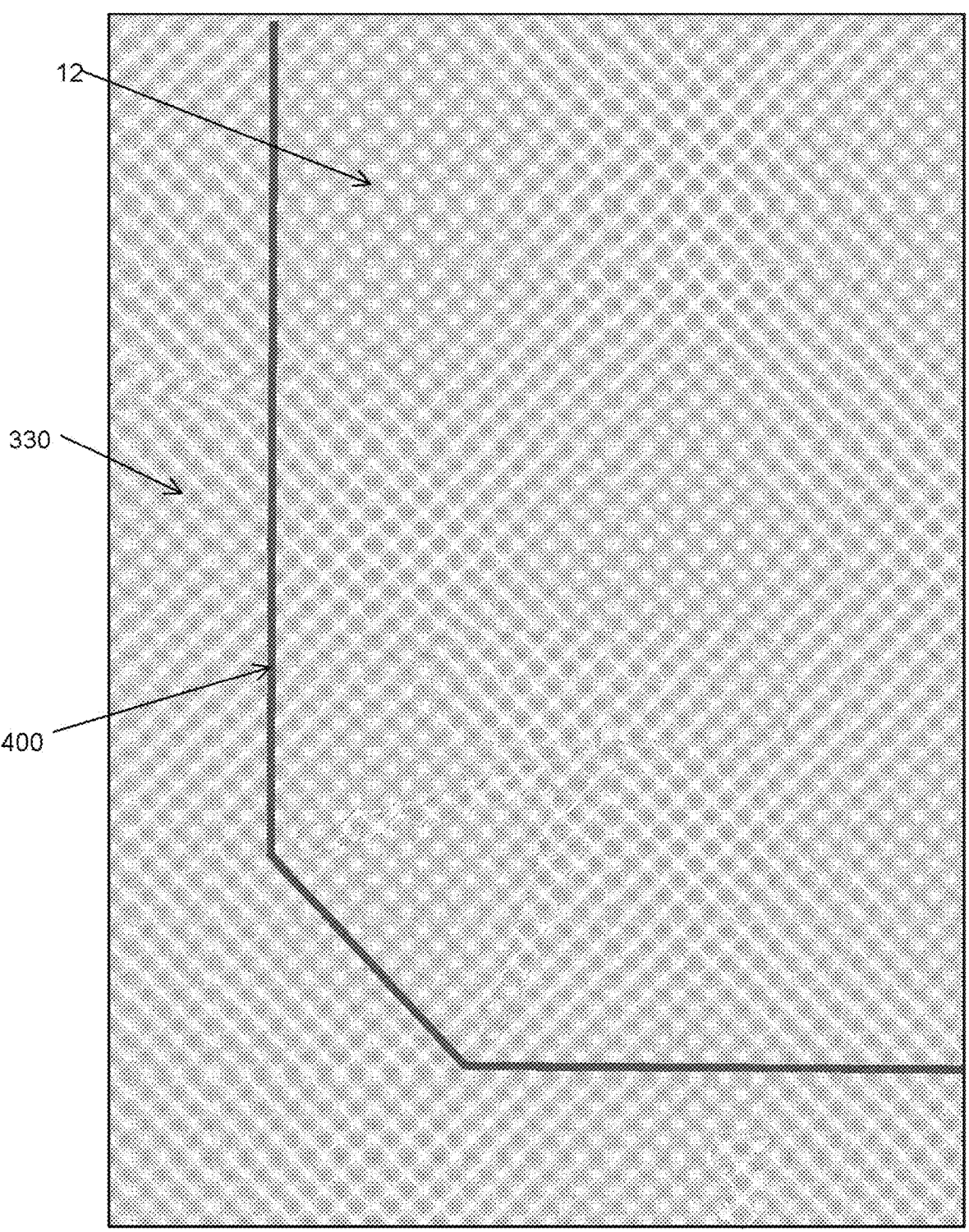
FIG. 5 is a plan view of FIG. 3.

For greater strength, a termination keyway channel 400 may be cut along the boundary of the region of the concrete surface 5 surrounding the joint 305 (e.g. six inches away from the joint) as further shown in FIG. 5. When the termination keyway channel 400 is present, then the first laminate layer 12 terminates within the keyway channel 400 and the geotextile fabric layer 330 also terminates within the keyway channel 400. The first laminate layer 12 and the geotextile fabric layer 330 may then be mechanically anchored (e.g. via screws or similar fasteners) within the termination keyway channel 400. When the second laminate layer 12 is later applied, it may then cover the termination keyway channel 400.

For a standard concrete surface or concrete tank, the termination keyway channel 400 may be cut to a one-inch depth, with a width of one-quarter-inch, within standard tolerances. The termination keyway channels 400 should be cut on both sides of all moving joints or corners of the concrete surface 5 in order to relieve the flexible areas from being adhered to the joint and allow substrate movement without damaging the laminate layers 12 being applied.

In the preceding detailed description, reference has been made to the accompanying drawings that form a part hereof, and which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of applying a surface coating to a concrete surface with a joint wherein the method comprises the steps of:

cleaning the concrete surface;

repairing cracks in the concrete surface, wherein any cracks in the concrete surface are repaired and degreased;

adjusting a temperature of the concrete surface, wherein the temperature of the concrete surface is adjusted to a temperature ranging between 15 to 22 degrees Celsius;

conditioning surface coating materials utilized in the method, wherein the surface coating materials utilized in the method are conditioned to a temperature that is equivalent to the temperature of the concrete surface;

applying a primer layer to the concrete surface including the joint;

applying a first laminate layer to the concrete surface excluding the joint and a region of the concrete surface surrounding the joint;

applying a second laminate layer over the first laminate layer;

applying a first flexible laminate layer over the region of the concrete surface surrounding the joint;

applying a geotextile fabric layer over the joint and the region of the concrete surface surrounding the joint; and applying a second flexible laminate layer over the geotextile layer and a portion of the second laminate layer.

2. The method of claim 1, wherein the region of the concrete surface is at least six inches from the joint.

3. The method of claim 1, further comprising a step of applying a layer of bond breaker tape over the joint prior to the step of applying the first laminate layer.

4. The method of claim 1, further comprising a step of applying one or more additional laminate layers over the second laminate layer.

5. The method of claim 1, further comprising a step of applying one or more additional coating layers over the second laminate layer.

6. The method of claim 1, further comprising a step of cutting a termination keyway channel along a boundary marking the region of the concrete surface surrounding the joint prior to the step of applying the first laminate layer wherein the geotextile fabric layer and the first laminate later terminate within the keyway channel.

7. The method of claim 6, further comprising a step of mechanically anchoring the first laminate layer and the geotextile fabric layer within the termination keyway channel.

8. The method of claim 7, wherein the second flexible laminate layer covers the termination keyway channel.

9. The method of claim 1, wherein the cleaning of the concrete surface is performed utilizing sandblasting with a mixture of water and sand under a pressure of 35-50 MPa.

10. The method of claim 1, wherein the surface coating materials and the surface of the concrete are maintained at a temperature of 15 to 22 degrees Celsius for twenty-four hours prior to initiating application of the surface coating.

11. The method of claim 1, wherein the primer layer consists of unsaturated polyester resin and 3 percent hardener.

12. The method of claim 11, wherein the thickness of the primer layer is 0.12 millimeters having a deviation of 0.02 millimeters.

13. The method of claim 1, wherein the first laminate layer is chopped fiberglass impregnated with a mixture of resin and hardener.

14. The method of claim 13, wherein the second laminate layer is chopped fiberglass with a mixture of resin and hardener.

* * * * *